United States Patent [19]

Ueda et al.

[11] Patent Number: 4,888,403

[45] Date of Patent: Dec. 19, 1989

[54] PROCESS FOR PRODUCING PLASTIC-LIKE WOODY MOLDINGS FROM DIBASIC ACID ANHYDRIDES AND UNSATURATED MONOGLYCIDYL ETHERS

[75] Inventors: Minoru Ueda; Hideaki Matsuda; Hideki Mori, all of Kagawa, Japan

[73] Assignee: Okura Kogyo Kabushiki Kaisha, Japan

[21] Appl. No.: 148,574

[22] Filed: Jan. 26, 1988

[30] Foreign Application Priority Data

Jan. 26, 1987 [JP] Japan .................................. 62-14224

[51] Int. Cl.[4] .............................................. C08B 3/22
[52] U.S. Cl. .................................... 527/103; 523/512; 523/527; 524/599; 427/386
[58] Field of Search ................. 527/103; 523/512, 527; 524/599

[56] References Cited

U.S. PATENT DOCUMENTS 4,464,510  8/1984  Czvikovszky et al. ............. 527/103
4,663,163  5/1987  Hou et al. ............................ 527/300

FOREIGN PATENT DOCUMENTS 8380685  10/1983  Japan .
1215677   9/1986  Japan .................................. 527/103

*Primary Examiner*—John Kight
*Assistant Examiner*—Frederick Krass
*Attorney, Agent, or Firm*—Jacobs & Jacobs

[57] ABSTRACT

The process for producing a plastic-like cured woody molding, which comprises applying a pressure necessary for plasticizing at least a woody component at temperature of from 120° C. to 180° C. to a composition comprising (A) an oligoesterified woody material obtained by alternately adding a polybasic acid anhydride and a monoepoxy compound having unsaturated double bond to the hydroxy groups of a woody material and (B) an oligomer obtained from a polybasic acid anhydride and a monoepoxy compound having unsaturated double bond with the addition of (C) a radical polymerization initiator to simultaneously perform the plasticization and crosslinking by the polymerization of the unsaturated double bonds. The plastic-like cured woody moldings thus obtained have dense and glossy surfaces and are particularly excellent in dimensional stability, mechanical properties and heat distortion temperature.

19 Claims, No Drawings

PROCESS FOR PRODUCING PLASTIC-LIKE WOODY MOLDINGS FROM DIBASIC ACID ANHYDRIDES AND UNSATURATED MONOGLYCIDYL ETHERS

FIELD OF THE INVENTION

This invention relates to a process for industrially advantageously producing plastic-like cured woody moldings having dense and glossy surface and being particularly excellent in the properties such as dimensional stability, mechanical properties, heat distortion temperature, etc., by plasticizing woody components.

BACKGROUND OF THE INVENTION

Woods have hitherto been used for various uses such as building materials, etc., because of the excellent features. However, woods are lacking in heat plasticity and are insufficient in dimensional stability, humidity resistance, mechanical properties, etc., according to the uses. From such a view point, it has recently been investigated to impart woods the functions such as thermoplasticity which are not originally owned by woods by applying a proper chemical modification to the woods. These investigations are important from not only the development for new materials but also the point of effective utilization of unutilized woody sources, such as twiggy woods and periodically thinned woods, etc.

The inventors previously proposed a production process of modified wood chips by an oligoesterification of alternately adducting a dibasic acid anhydride and a monoepoxy compound to the hydroxy groups in the wood chips (Japanese Patent Publication (unexamined) No. 83806/85). Furthermore, it was found that the modified wood chips and the moldings obtained by heat-press molding these wood chips were excellent in humidity resistance and water resistance and also according to the kind of the oligoester chain, the wood components could be plasticized at the heat-press molding.

Thus, the inventors proceeded detailed investigations expecting that when an unsaturated double bond was introduced into the oligoester chain of the modified woody materials, crosslinking occured by the polymerization of the double bonds simultaneously with plasticization of the woody component of the oligoesterified woody material (hereinafter referred simply to the woody component) at the heat-press molding to provide cured woody moldings having more excellent performance. As the result of the investigations, it has been clarified that in the case of using a monoepoxy compound having unsaturated double bond as the raw material component for introducing unsaturated double bond into the oligoester chain, the oligoesterified woody material obtained can be plasticized only at high temperatures of higher than 180° C., in particular, higher than 200° C. and also the plasticizable extent is low. Furthermore, the tendency becomes remarkable with the increase of the content of woody components.

From the view point of the effective utilization of woody materials, it is very significant for industrial purposes to establish a production process of plasticized woody moldings having a large content of woody components. In regard to the molding temperature, if the molding temperature is not more than 180° C., the moldings obtained are insufficient in homogeneity, mechanical strength, etc., since sufficient plasticization is not, as a matter of course, obtained, while if the molding temperature is over 180° C., thermal decomposition of the woody material itself is caused even if plastization occurs and also such a high temperature condition is not preferably from the point of energy efficiency.

SUMMARY OF THE INVENTION

The inventors have discovered a process of industrially advantageously producing plastic-like cured woody moldings having dense and glossy surfaces and being excellent in various properties by simultaneously causing the plasticization of woody components and the crosslinking thereof by the polymerization of unsaturated double bonds in the oligoester chain under a heat-press molding condition at a relatively low temperature and of a relatively short period of time even if the content of woody components is high, and have succeeded in accomplishing the present invention based on this discovery.

That is, as the result of various investigations for solving the problems as described above, the inventors have discovered that by the co-existence of an oligomer having unsaturated double bonds, before-mentioned oligoesterified woody material having unsaturated double bond can be easily plasticized at heat-press molding and also the crosslinking occurs by the polymerization of the double bond of the oligoester chain in the oligoesterified woody material and the double bond in the oligomer to provide woody moldings having excellent properties.

Thus, according to this invention, there is provided a process for producing plastic-like cured woody moldings, which comprises applying a pressure necessary for plasticizing at least woody components at temperature of from 120° C. to 180° C. to a composition comprising (A) an oligoesterified woody material obtained by alternately adducting a polybasic acid anhydride and a monoepoxy compound having unsaturated double bond to the hydroxy groups in the woody materials and (B) an oligomer obtained from a polybasic acid anhydride and a monoepoxy compound having unsaturated double bond, if necessary, with the addition of (C) a radical polymerization initiator to simultaneously perform the plasticization and the crosslinking by the polymerization of the double bonds.

According to the process of this invention, the oligoesterified woody material can be easily plasticized and the moldings thus obtained have dense and glossy surfaces and are particularly excellent in dimensional stability, mechanical properties, and heat distortion temperature. Also, these moldings can be industrially advantageously produced by the process of this invention.

DETAILED DESCRIPTION OF THE INVENTION

The oligoesterified woody material (A) and the oligomer (B) which are used in this invention are produced from the following raw materials.

Crushed woods such as wood meals, wood fibers, wood chips, etc., are mainly used as the woody material and there is no particularly restriction on the kind of raw woods. Also, woody materials in this invention include vegetable fibers from rice straws, chaffs, etc., and the other crushed lignocellulose materials composed of cellulose and lignin as the main components. And the water content of these woody materials is preferred to be not more than 5%.

As the polybasic acid anhydride for use in this invention, there are maleic anhydride, phthalic anhydride, succinic anhydride, tetrahydrophthalic anhydride, hexahydrophthalic anhydride, dichloromaleic anhydride, 3,6-dichlorophthalic anhydride, 4,5-dichlorophthalic anhydride, itaconic anhydride, chlorendic anhydride, etc. In these acid anhydrides, maleic anhydride, phthalic anhydride, succinic anhydride, etc., which are industrially available at low cost, are preferred and also maleic anhydride and phthalic anhydride are particularly preferred since the plastic-like cured woody moldings obtained are excellent in properties as compared with the case of using other polybasic acid anhydrides.

As the monoepoxy compound having unsaturated double bond, there are allyl glycidyl ether, methallyl glycidyl ether, glycidyl methacrylate, glycidyl acrylate, vinylcyclohexene monoepoxide, etc., and for industrial purposes, allyl glycidyl ether and glycidyl methacrylate are particularly preferred.

The oligoesterified woody material (A) which is used in this invention is obtained by alternately adducting the polybasic acid anhydride and the monoepoxy compound having unsaturated double bond to the hydroxy groups in the woody material. In this case, the sum of the using amount of the polybasic acid anhydride and the using amount of the monoepoxy compound having unsaturated double bond can be from 30 to 800 parts by weight per 100 parts by weight of the woody material, but the adducted amount of them to the woody material varies with the reaction condition and the sum of the using amount of them. In this invention, it is preferred to use the oligoesterified woody material having a woody component content of from 60% by weight to 90% by weight and hence it is preferred to select the using amounts in the range of satisfying the aforesaid condition. And, it is preferred to use from 1 mol to 2 mols of the monoepoxy compound to 1 mol of the polybasic acid anhydride.

The main reaction in this invention is an alternate esterification reaction, but as the case may be, an etherification of the epoxy group of the monoepoxy compound may partially occur. Also, for accelerating the above-described reaction, an ordinary esterification catalyst may be used. The proceeding state of the alternate addition reaction in this invention differs according to the kinds of the polybasic acid anhydride and the monoepoxy compound having unsaturated double bond, but in general, the reaction easily proceeds at temperatures of higher than 60° C. and continues until the residual acid value and epoxy values in the system decrease and become almost constant. After the reaction, soluble portions are removed by extracting with a solvent such as acetone, etc., whereby the oligoesterified woody material for use in this invention is obtained.

Any oligomer (B) which is obtained using the aforesaid polybasic acid anhydride and monoepoxy compound having unsaturated double bond as the main components by the alternate esterification reaction as the main reaction can be used without any restriction, but the oligomer having a similar structure to the oligoester chain of the oligoesterified woody material (A) is preferred in the point of affinity between the oligoesterified woody material and the oligomer.

In the general production process of this invention, a polybasic acid anhydride and a monoepoxy compound having unsaturated double bond are reacted in the existence of, for example, a polymerization initiator having active hydrogen at the terminal thereof for 5 hours at temperatures of from 60° C. to 120° C. In this case, the oligomer thus obtained is preferred to be liquid or paste of a molecular weight from about 200 to about 1,000 (the polymerization degree being preferably 5 or less than 5 and including 1) considering from the points of utilizability and effect. In this case, an ordinary addition esterification catalyst may be used for accelerating the reaction.

On the other hand, it has been found that when the polybasic acid anhydride and the monoepoxy compound having unsaturated double bond are used in the range of from 30 to 150 parts by weight in the sum of the using amounts to 100 parts by weight of the woody materials in the case of producing the oligoesterified woody material (A), the oligoesterified woody material (A) is formed and, at the same time, about 30% by weight to about 80% by weight of the polybasic acid anhydride and the monoepoxy compound having unsaturated double bond which were used for the reaction form the oligomer (B). In this case, the reaction product can be used as the composition composed of the oligoesterified woody material (A) and the oligomer (B) in this invention as it is without being subjected to an extraction treatment with a solvent such as acetone, etc. This mode of reaction is industrially advantageous since the steps of extraction treatment, etc., can be saved.

In this invention, by the co-existence of the oligomer, the woody components are plasticized and, at the same time, the unsaturated double bonds in the oligoesterified woody material and the oligomer are polymerized with crosslinking at heat-press molding to strongly unite to one homogeneous cured molding. In this case, hardening can be accelerated by adding a small amount of a radical polymerization initiator according to the kind of the unsaturated double bonds. That is, when the unsaturated double bond is a methacryl group, the hardening generally proceeds by heat polymerization only without the existence of a radical polymerization initiator but when the unsaturated double bond is an allyl group, a radical polymerization intiator is necessary. As the radical polymerization initiator, an organic peroxide such as dicumyl peroxide, benzoyl peroxide and cumene hydroperoxide, or azobis-isobutylonitrile is suitably used.

Furthermore, in this invention, flame retarders, reinforcing materials such as glass fibers, carbon fibers, etc., coloring agents such as dyes, pigments, etc., inorganic fillers, etc., may be added to the reaction mixture.

Also, at heat-press molding, a resin-impregnated paper or cloth composed of a reinforcing sheet such as paper, cloth, etc., and a thermosetting resin, or a thermoplastic resin film may be applied to one surface or both surfaces of the aforesaid composition and they may be molded in a body. By employing such a reinforcing means, the properties of the moldings can be preferably more increased.

Then, the production process of this invention is explained in succession.

In this invention, the oligoesterified woody material (A) and the oligomer (B) prepared as described above are sufficiently mixed, if necessary, together with the polymerization initiator (C). It is preferred that 10 to 45 parts by weight of the oligomer (B) is mixed with 100 parts by weight of the oligoesterified woody material (A). There is not particular restriction on the mixing manner and the mixture can be formed by using a kneading means such as blender, kneader, mixing mill, Banbury mixer, etc. In this case, if the oligomer (B) co-exists in the oligoesterified woody material (A) and the polymerization initiator (C) is not added, the mixing step may be saved.

Then, the mixture obtained as described above is placed in a mold or formed between specular plates, etc., and heat-pressed at 120° C. to 180° C. to provide a plastic-like woody molding. If the heating temperature is lower than 120° C., the oligoesterified woody material (A) is not plasticized and if the heating temperature is over 180° C., undesirable heat decomposition of the oligoesterified woody material (A) is caused.

The pressure may be one necessary for plasticizing the oligoesterified woody material (A) at the aforesaid temperature and is generally from 30 Kg/cm² to 600 Kg/cm², preferably from 50 Kg/cm² to 500 Kg/cm². The pressing time may be from 10 minutes to 40 minutes. Under the heat-press condition described above, the woody component is plasticized and, at the same time, the double bonds in the oligoesterified woody material (A) and the double bonds in the oligomer (B) existing in the composition are polymerized to cause crosslinking, whereby strong chemical bonding is formed between the oligoesterified woody material (A) and the oligomer (B) to form a strong network structure as the whole system.

As described above, this invention provides an industrially advantageous process for producing plastic-like cured woody moldings by heat-press molding the oligoesterified woody material (A) containing an oligoester chain having unsaturated double bond in the co-existence of the oligomer (B) having unsaturated double bond.

By co-existence of the oligomer obtained from the polybasic acid anhydride and the monoepoxy compound having unsaturated double bond, the plasticization of the woody component, the heat fluidization of which has hitherto been difficult, is facilitated, whereby molding of the woody material under a mild condition of not more than 180° C., the temperature of not causing heat deterioration of the woody material, became possible. Also, at heat-press molding, the woody component is fluidized by plasticization and, at the same time, the unsaturated double bonds of the oligoesterified woody material (A) and the unsaturated double bonds of the oligomer (B) are polymerized to form covalent bond, whereby the oligoesterified woody material and the oligomer are strongly united with each other to form a united three-dimensional structure. Accordingly, the molding obtained has a homogeneous and beautiful plastic-like appearance in spite of containing large amounts of woody material and is excellent in mechanical strengths such as compression strength, bending strength, etc., and other various properties such as heat distortion temperature, dimensional stability, etc. Also, the molding retains the machinability of workability such as easily plaining property, etc., which are originally owned by the wood and is suitably utilized in various fields such as building materials, electric insulating materials, materials for industrial parts, etc. Furthermore, the invention also has an advantage of being able to utilize effectively woody materials as industrial wastes in wood industry and unutilized woody materials and hence is industrially very useful.

The following examples are intended to illustrate the invention in more practically but not to limit in any way.

First, the production examples of oligoesterified woody materials (A) for use in the invention are explained. All parts are shown by weight.

PRODUCTION EXAMPLE 1

In a reaction vessel equipped with a stirrer and a reflux condenser were placed 100.0 parts of a dry wood meal of a Japanese red pine passing through a 24 mesh sieve (hereinafter, is referred to as simply dry wood meal) as woody material and 39.8 parts of maleic anhydride and after stirring the mixture for one hour at 120° C., 60.2 parts of allyl glycidyl ether of 1.3 mole times the amount of the maleic anhydride was added dropwise to the mixture over a period of about 15 minutes. Thereafter, and alternate addition esterification reaction was performed for 7 hours at the same temperature. The final residual acid value of the system was 0.33 eq/Kg and the epoxy value was 0.22 eq/Kg. After the reaction was over, soluble portions with acetone was removed by means of a Soxhlet extractor to provide an oligoesterified wood which was an oligoesterified woody material. The total addition percentage of maleic anhydride and allyl glycidyl ether added to the wood of the oligoesterified wood was 57.3% by weight based on the weight of the wood.

PRODUCTION EXAMPLE 2

(a) By following the same procedure as Production Example 1 except that 100.0 parts of dry wood meal, 21.4 parts of maleic anhydride and 32.4 parts of allyl glycidyl ether were used, an alternate esterification reaction was performed. The final residual acid value of the system was 0.47 eq/Kg and the epoxy value was 0.25 eq/Kg.

(b) After the reaction in above step (a) was over, soluble portion with acetone of the half of the reaction mixture obtained were removed by means of Soxhlet extractor to provide an oligoesterified wood. The total addition percentage of maleic anhydride and allyl glycidyl ether added to the wood of the oligoesterified wood was 28.4% by weight based on the weight of the wood. Also, by removing acetone from the acetone extract, an oligomer similar to the oligoester chain of the oligoesterified wood was obtained. The weight ratio the oligoesterified wood to the oligomer was 83.5 to 16.5. Also, the result of performing the molecular weight measurement of the oligomer by a gel permeation chromatography (GPC) showed that the mean molecular weight thereof was about 400. Accordingly, the weight ratio of the oligoesterified wood to the oligomer in the reaction product obtained in above step (a) was 83.5 to 16.5 as described above.

PRODUCTION EXAMPLE 3

By following the same procedure as Production Example 1 except that 100.0 parts of dry wood meal, 13.3 parts of maleic anhydride and 20.1 parts of allyl glycidyl ether were used, an alternate addition esterification reaction was performed. The final residual acid value of the system was 0.46 eq/Kg and the epoxy value was 0.32 eq/Kg. A part of the reaction mixture obtained was sampled and analyzed. The result showed that the reaction product was composed of an oligoesterified wood and an oligomer and the total addition percentage of maleic anhydride and allyl glycidyl ether added to the wood of the oligoesterified wood was 14.3% by weight based on the weight of the wood. Also, the weight ratio of the oligoesterified wood to the oligomer was 85.7 to 14.3. As the result of measuring the molecular weight of the oligomer by GPC, the mean molecular weight thereof was about 390.

EXAMPLE 1

After adding 10.7 parts of the oligomer having a mean molecular weight of about 400 obtained from maleic anhydride and allyl glycidyl ether and 1.0 part of dicumyl peroxide as a radical polymerization initiator to 39.3 parts of the oligoesterified wood obtained in Production Example 1, the mixture was uniformly kneaded by a mixing mill to provide a kneaded mixture. Thereafter, the kneaded mixture was uniformly placed in a mold. Then, the mold was inserted between hot plates of a pressing machine and heat-press molded. In the heat-press molding condition, the temperature was 150° C., the pressure was 270 Kg/cm², and the time was 30 minutes. By the heat-press molding, a plastic-like cured woody molding having a thickness of 6.8 mm and woody percentage of 49% was obtained.

EXAMPLE 2

After adding 1.0 part of dicumyl peroxide as a radical polymerization initiator to 50 parts of the composition composed of the oligoesterified wood and oligomer obtained in step (a) of Production Example 2, the mixture was uniformly kneaded by means of a mixing mill to provide a kneaded mixture. Thereafter, the kneaded mixture described above was heat-press molded as in Example 1 to provide a plastic-like cured woody molding having a thickness of 7.0 mm and a woody percentage of 64%.

EXAMPLE 3

After adding 1.0 part of dicumyl peroxide as a radical polymerization initiator to 50 parts of the composition composed of the oligoesterified wood and oligomer obtained in Production Example 3, the mixture was uniformly kneaded by means of a mixing mill to provide a kneaded mixture. Thereafter, by heat-press molding the aforesaid kneaded mixture as Example 1, a plastic-like cured woody molding having a thickness of 6.9 mm and a woody percentage of 74% was obtained.

COMPARISON EXAMPLE 1

After adding 1.0 part of dicumyl peroxide as a radical polymerization initiator to 50.0 parts of the oligoesterified wood obtained in step (b) of Production Example 2, the mixture was uniformly kneaded by a mixing mill to provide a kneaded mixture. Thereafter, the kneaded mixture was heat-press molded as in Example 1 to provide a cured woody molding having a thickness of 7.2 mm and a woody percentage of 76%.

Now, in the woody moldings obtained by the production process of this invention obtained in Examples 1 to 3, when the cross section of each molding was observed by a scanning electron microscope, the form of wood meal was not observed and it was observed that the woody components were plasticized in spite of molding the kneaded mixture at relatively low temperature of 150° C. at heat-press molding since the oligomer existed in the oligoesterified wood. On the other hand, in the woody molding obtained in Comparison Example 1, the plasticization of wood by heat-press molding did not occur and form of wood meal was observed on the surface of the molding since oligomer did not co-exist in the oligoesterified wood.

Samples were cut from the cured woody moldings obtained in Examples 1 to 3 and Comparison Example 1 and the properties thereof were tested. The results obtained by the tests were shown in Table 1, In addition, the test procedures of the property tests were performed according to the following methods of ASTM.

Bending Test: ASTM.D790-66
Compression Test: ASTM.D695-69
Heat Distortion Temperature Test: ASTM.D648-56
Rockwell Hardness Test: ASTM.D785-65
Water Absorption (Thickness Swelling Degree) Test: ASTM.D570-63.

TABLE 1

| | Example 1 | Example 2 | Example 3 | Comparison Example 1 |
|---|---|---|---|---|
| Woody Percentage (%) | 49 | 64 | 74 | 77 |
| Appearance | Plasticized (Brown) | Plasticized (Brown) | Plasticized (Brown) | Not Plasticized (Loess Color) |
| Specific Gravity | 1.37 | 1.40 | 1.39 | 1.33 |
| Bending Strength (Kg/cm²) | 813 | 813 | 785 | 475 |
| Compression Strength (Kg/cm²) | 2246 | 1964 | 1615 | 1171 |
| Heat Distortion Temp. (°C.) (18.6 Kg/cm²) | 220 | 191 | 165 | 140 |
| Rockwell Hardness (M Scale) | 112 | 109 | 104 | 99 |
| Water Absorption Test: Water (23° C.) | | | | |
| Water Absorption (%) | 1.45 | 2.67 | 3.37 | 7.21 |
| Thickness Swelling Degree (%) | 1.08 | 2.90 | 3.87 | 6.64 |
| Boiling Water | | | | |
| Water Absorption (%) | 2.62 | 4.65 | 5.90 | 25.66 |
| Thickness Swelling Degree (%) | 1.66 | 3.70 | 5.22 | 15.75 |

As is clear from the results shown in Table 1, the plastic-like cured woody moldings by the production process of this invention obtained in Examples 1 to 3 are excellent in properties such as, in particular, dimensional stability, mechanical properties, and heat distortion temperature as compared with the woody molding in Comparison Example 1 obtained by heat-press molding the oligoesterified woody material without the co-existence of oligomer. This is considered to be based on that in Examples 1 to 3, the crosslinking of unsaturated double bonds by polymerization occures simultaneously with the plasticization of the woody components, whereby the wood and oligomer cause strong chemical bonding to form three-dimensional structure.

PRODUCTION EXAMPLE 4

(a) By following the same procedure as Production Example 1 except that 100.0 parts of dry wood meal, 18.7 parts of maleic anhydride, and 35.2 parts of glycidyl methacrylate were used, an alternate addition esterification reaction was performed. The final residual acid value of the system was 0.30 eq/Kg and the epoxy value was 0.15 eq/Kg.

(b) After the reaction of step (a) described above was over, from ⅓ of the reaction mixture obtained was extracted out the soluble portions with acetone by a Soxhlet extractor to provide an oligoesterified wood. The total addition percentage of maleic anhydride and glycidyl methacrylate added to the wood of the oligoestrified wood was 24.4% by weight based on the weight of the wood. Also, when acetone was removed from the acetone extract, an oligomer similar to the oligoester chain of the oligoestrified wood was obtained. The weight ratio of the oligoestrified wood to the oligomer was 80.8 to 19.2. Also, the result of performing the molecular weight of the oligomer by GPC was about 430. Accordingly, the weight ratio of the oligoesterified wood to the oligomer in the reaction product obtained in step (a) described above was 0.8 to 19.2.

Thereafter, the kneaded mixture was heat-press molded as in Example 4 to provide a woody molding having a thickness of 7.2 mm and a woody percentage of 79%.

Now, in the woody moldings by the production process of this invention obtained in Examples 4 and 5, when the cross section of each molding was observed by a scanning electron microscope, the form of wood meal was not observed and it was observed that the woody components were plasticized in spite of molding at a relatively low temperature of 150° C. at heat-press molding since the oligomer co-existed in the oligoesterified wood. On the other hand, in the woody molding obtained in Comparison Example 2, the plasticization of wood at heat-press molding did not occur and the form of wood meal was observed since oligomer did not exist in the oligoestrified wood at heat-press molding.

Then, samples were cut from the woody moldings obtained in Examples 4 and 5 and Comparison Example 2 and the properties thereof were tested. The results of the property tests are shown in Table 2 below.

TABLE 2

|  | Example 4 | Example 5 | Comparison Example 2 |
| --- | --- | --- | --- |
| Woody Percentage (%) | 64 | 65 | 79 |
| Appearance | Plasticized (Brown) | Plasticized (Brown) | Not Plasticized (Loess Color) |
| Specific Gravity | 1.40 | 1.41 | 1.37 |
| Bending Strength (Kg/cm$^2$) | 901 | 1081 | 661 |
| Compression Strength (Kg/cm$^2$) | 2307 | 2311 | 1293 |
| Heat Distortion Temperature (°C.) (18.6 Kg/cm$^2$) | 174 | 181 | 154 |
| Rockwell Hardness (M Scale) | 117 | 119 | 98 |
| Water Absorption Test: |  |  |  |
| Water (23° C.) |  |  |  |
| Water Absorption (%) | 0.86 | 1.12 | 2.59 |
| Thickness Swelling Degree (%) | 0.71 | 0.98 | 2.26 |
| Boiling Water |  |  |  |
| Water Absorption (%) | 2.80 | 3.57 | 6.02 |
| Thickness Swelling Degree (%) | 2.21 | 2.73 | 4.60 |

EXAMPLE 4

After adding 1.0 part of dicumyl peroxide as a radical polymerization initiator to 50 parts of the composition composed of the oligoesterified wood and oligomer obtained in step (a) of Production Example 4, the mixture was uniformly kneaded by a mixing mill to provide a kneaded mixture, thereafter, the kneaded mixture was uniformly placed in a mold. Then, the mold was inserted between hot plates of a pressing machine and heat-press molding was performed.

In the heat-press molding condition, the molding temperature was 150° C. and the molding pressure was 440 Kg/cm$^2$. After the heat-press molding, a plastic-like cured woody molding having a thickness of 7.0 mm and a woody percentage of 64% was obtained.

EXAMPLE 5

By following the molding procedure as Example 4 except that the radical polymerization initiator (dicumyl peroxide) used in Example 4 was not used, a plastic-like cured woody molding having a thickness of 6.9 mm and a woody percentage of 65% was obtained.

COMPARISON EXAMPLE 2

After adding 1.0 part of dicumyl peroxide as a radical polymerization initiator of 50 parts of the oligoesterified wood obtained in step (b) of Production Example 4, the mixture was uniformly kneaded by a mixing mill.

As is clear from the results shown in Table 2, the plastic-like woody cured moldings by the production process of this invention obtained in Examples 4 and 5 are excellent in properties such as, in particular, dimensional stability, mechanical properties, and heat distortion temperature as compared with the woody molding in Comparison Example 2 obtained by heat-press molding the oligoesterified wood without the co-existence of oligomer therein. This is considered to be based on that in Examples 4 and 5, crosslinking by the polymerization of the unsaturated double bonds occurs simultaneously with the plasticization of woody components, whereby the woody components and the oligomer cause strong chemical bonding with each other to form a three-dimensional structure.

PRODUCTION EXAMPLE 5

By following the same procedure as Production Example 1 except that 100.0 parts of dry rice chaff powder passing 100 mesh sieve as woody material, 21.4 parts of maleic anhydride, and 32.4 parts of allyl glycidyl ether were used, and alternate addition esterification reaction was performed. The final residual acid value of the system was 0.12 eq/Kg and the epoxy value was 0.43 eq/Kg.

A part of the reaction mixture was sampled and analyzed. The results obtained were as follows. That is, the reaction product was composed of oligoesterified chaff as an oligoesterified woody material and an oligomer and the total addition percentage of maleic anhydride and allyl glycidyl ether added to the chaff of the oligoesterified chaff was 22.1% by weight based on the chaff. Also, the weight ratio of the oligoesterified chaff to the oligomer was 79.4 to 20.6. The result of measuring the molecular weight of the oligomer by GPC showed that the mean molecular weight thereof was about 400.

PRODUCTION EXAMPLE 6

After placing 100.0 parts of dry wood meal and 24.0 parts of phthalic anhydride in a reaction vessel equipped with a stirrer and a reflux condenser, the mixture was stirred for one hour at 150° C., and then 29.9 parts of glycidyl methacrylate of 1.3 mole times the amount of the phthalic anhydride was added dropwise to the mixture over a period of about 15 minutes. Thereafter, an alternate addition esterification reaction was performed for 7 hours at 120° C. The final residual acid value of the system was 0.22 eq/Kg and the epoxy value was 0.04 eq/Kg.

A part of the reaction mixture obtained was sampled and analyzed. The result showed that the reaction product was composed of an oligoesterified wood and an oligomer and the total addition percentage of phthalic anhydride and glycidyl methacrylate added to the wood of the oligoesterified wood was 14.0% based on the weight of the wood. Also, the weight ratio of the oligoesterified wood to the oligomer was 74.1 to 25.9. The result of measuring the molecular weight of the oligomer by GPC showed that the mean molecular weight thereof was about 410.

EXAMPLE 6

After adding 1.0 part of dicumyl peroxide as a radical polymerization initiator to 50 parts of the composition composed of the oligoesterified chaff and the oligomer obtained in Production Example 5, the mixture was uniformly kneaded by a mixing mill. Thereafter, the kneaded mixture was heat-press molded as in Example 1 to provide a plastic-like cured woody molding having a thickness of 6.5 mm and chaff percentage of 64%.

EXAMPLE 7

By heat-press molding the composition composed of the oligoesterified wood and the oligomer obtained in Production Example 6 as in Example 4, a plastic-like cured woody molding having a thickness of 6.9 mm and woody percentage of 65% was obtained.

In the woody moldings by the production process of this invention obtained in Examples 6 and 7, when the cross section of each molding was observed by a scanning electron microscope, the form of chaff or wood meal was not observed and it was observed that the woody components were plasticized in spite of molding at a relatively low temperature of 150° C. since oligomer co-existed in the oligoesterified woody materials at heat-press molding.

Samples were cut from the plastic-like cured woody molding obtained in Examples 6 and 7 and the properties of each sample were tested. The results of the property tests thus obtained are shown in Table 3 below.

TABLE 3

|  | Example 6 | Example 7 |
| --- | --- | --- |
| Chaff or Woody Percentage (%) | 64 | 65 |
| Appearance | Plasticized (Brown) | Plasticized (Brown) |
| Specific Gravity | 1.43 | 1.39 |
| Bending Strength (Kg/cm$^2$) | 667 | 1066 |
| Compression Strength (Kg/cm$^2$) | 2210 | 2043 |
| Heat Distortion Temperature (°C.) | 210 | 169 |

TABLE 3-continued

|  | Example 6 | Example 7 |
| --- | --- | --- |
| (18.6 Kg/cm$^2$) |  |  |
| Rockwell Hardness (M Scale) | 107 | 118 |
| Water Absorption Test: |  |  |
| Water (23° C.) |  |  |
| Water Absorption (%) | 0.92 | 0.98 |
| Thickness Swelling Degree (%) | 0.48 | 0.86 |
| Boiling Water |  |  |
| Water Absorption (%) | 2.25 | 2.51 |
| Thickness Swelling Degree (%) | 1.27 | 2.09 |

As is clear from the results shown in Table 3, the plastic-like cured woody moldings by the production process of this invention obtained in Examples 6 and 7 are excellent in properties such as, in particular, dimensional stability, mechanical properties, and heat distortion temperature and thus the effect of this invention has been clearly confirmed.

What is claimed is:

1. A process for producing a woody molding, which comprises applying pressure capable of plasticizing at least the woody component of the compositions, at a temperature of from 120° C. to 180° C., to a composition comprising (A) an oligoesterified woody material obtained by alternately adducting a dibasic acid anhydride and a monoepoxy compound having an unsaturated double bond to the hydroxy groups of a woody material and (B) an oligomer obtained from a dibasic acid anhydride and a monoepoxy compound having an unsaturated double bond, whereby plasticization and crosslinking by the polymerization of the unsaturated double bonds occurs.

2. The process for producing a cured woody molding as claimed in claim 1, wherein the dibasic acid anhydride which is one of raw materials for the oligoesterified woody material (A) and the oligomer (B) is maleic anhydride, phthalic anhydride, succinic anhydride, tetrahydrophthalic anhydride, hexahydrophthalic anhydride, dichloromaleic anhydride, 3,6-dichlorophthalic anhydride, 4,5-dichlorophthalic anhydride, itaconic anhydride, or chlorendic anhydride.

3. The process for producing a cured woody molding as claimed in claim 1, wherein the dibasic acid anhydride which is one of raw materials for the oligoesterified woody material (A) and the oligomer (B) is maleic anhydride, phthalic anhydride, or succinic anhydride.

4. The process for producing a cured woody molding as claimed in claim 1, wherein the monoepoxy compound having an unsaturated double bond which is one of raw materials for the oligoesterified woody material (A) and the oligomer (B) is allyl glycidyl ether, methallyl glycidyl ether, glycidyl methacrylate, glycidyl acrylate, or vinylcyclohexene monoepoxide.

5. The process for producing a cured woody molding as claimed in claim 1, wherein the monoepoxy compound having an unsaturated double bond which is one of raw materials for the oligoesterified woody material (A) and the oligomer (B) is allyl glycidyl ether or glycidyl methacrylate.

6. The process for producing a cured woody molding as claimed in claim 1, wherein the woody material is a crushed wood.

7. The process for producing a cured woody molding as claimed in claim 1, wherein the woody material is vegetable fibers from rice straws or chaffs, or crushed lignocellulose materials composed of cellulose and lignin as the main components dried to a water content of not more than 5%.

8. The process for producing a cured woody molding as claimed in claim 1, wherein the oligoesterified woody material is obtained from said woody material, said dibasic acid anhydride, and an amount of said compound having an unsaturated double bond of from 1 mol to 2 mols per mol of said dibasic acid anhydride.

9. The process for producing a cured woody molding as claimed in claim 1, wherein the content of the woody component of the oligoesterified woody material is from 60% by weight to 90% by weight.

10. The process for producing a cured woody molding as claimed in claim 1, wherein the oligomer (B) obtained from said dibasic acid anhydride and the monoepoxy compound having unsaturated double bond has a polymerization degree of not more than 5 (molecular weight of 200 to 1,000) and is in a liquid state or a pasty state.

11. The process for producing a cured woody molding as claimed in claim 1, wherein the content of the oligomer (B) in the composition is from 10 to 45 parts by weight per 100 parts by weight of the oligoesterified woody material (A).

12. The process for producing a cured woody molding as claimed in claim 1, wherein the oligoesterified woody material (A) is obtained by adding the dibasic acid anhydride to a dry woody material followed by reacting them to esterify the hydroxy groups in the woody material, and then adding the epoxy compound having an unsaturated double bond followed by the conducting of an oligoesterification reaction.

13. The process for producing a cured woody molding as claimed in claim 1, wherein the compound to be molded is one obtained by adding the dibasic acid anhydride and the monoepoxy compound having an unsaturated double bond in a total amount of from 30 to 150 parts by weight to 100 parts by weight of the dry woody material followed by heating to simultaneously form the mixture of the oligoesterified woody material (A) and the oligomer (B).

14. The process for producing a cured woody molding as claimed in claim 1, wherein the composition composed of the oligoesterified woody material (A) and the oligomer (B) is heat-pressed at a temperature of from 120° C. to 180° C. and a pressure of 30 Kg/cm$^2$ to 600 Kg/cm$^2$ for 10 minutes to 40 minutes.

15. A process for producing a woody molding, which comprises applying pressure capable of plasticizing at least the woody components of the composition, at a temperature of from 120° C. to 180° C., to a composition comprising (A) an oligoesterified woody material and (B) an oligomer obtained from a dibasic acid anhydride and a monoepoxy compound having an unsaturated double bond as claimed in claim 1, wherein said composition additionally comprises (C) a free radical polymerization initiator.

16. The process for producing a cured woody molding as claimed in claim 1, wherein the composition composed of the oligoesterified woody material (A) and the oligomer (B) additionally contains a flame retarder, a coloring agent selected from the group consisting of dyes and pigments, inorganic fillers and/or reinforcing materials.

17. The process for producing cured woody molding as claimed in claim 1, wherein during heat-press molding of the composition composed of the oligoesterified woody material (A) and the oligomer (B), a thermosetting resin-impregnated paper or cloth or a thermoplastic film is applied on one or both sides of the compositions.

18. The process according to claim 6, wherein said crushed wood is a wood meal, wood fibers or wood chips dried to a water content of not more than 5%.

19. The process according to claim 15, wherein said free radical polymerization initiation is dicumyl peroxide, benzoyl peroxide, cumene hydroperoxide or azobisisobutylnitrile or mixtures thereof.

* * * * *